2,923,086
LIVE BAIT CONTAINER WITH AUTOMATIC CLOSURE

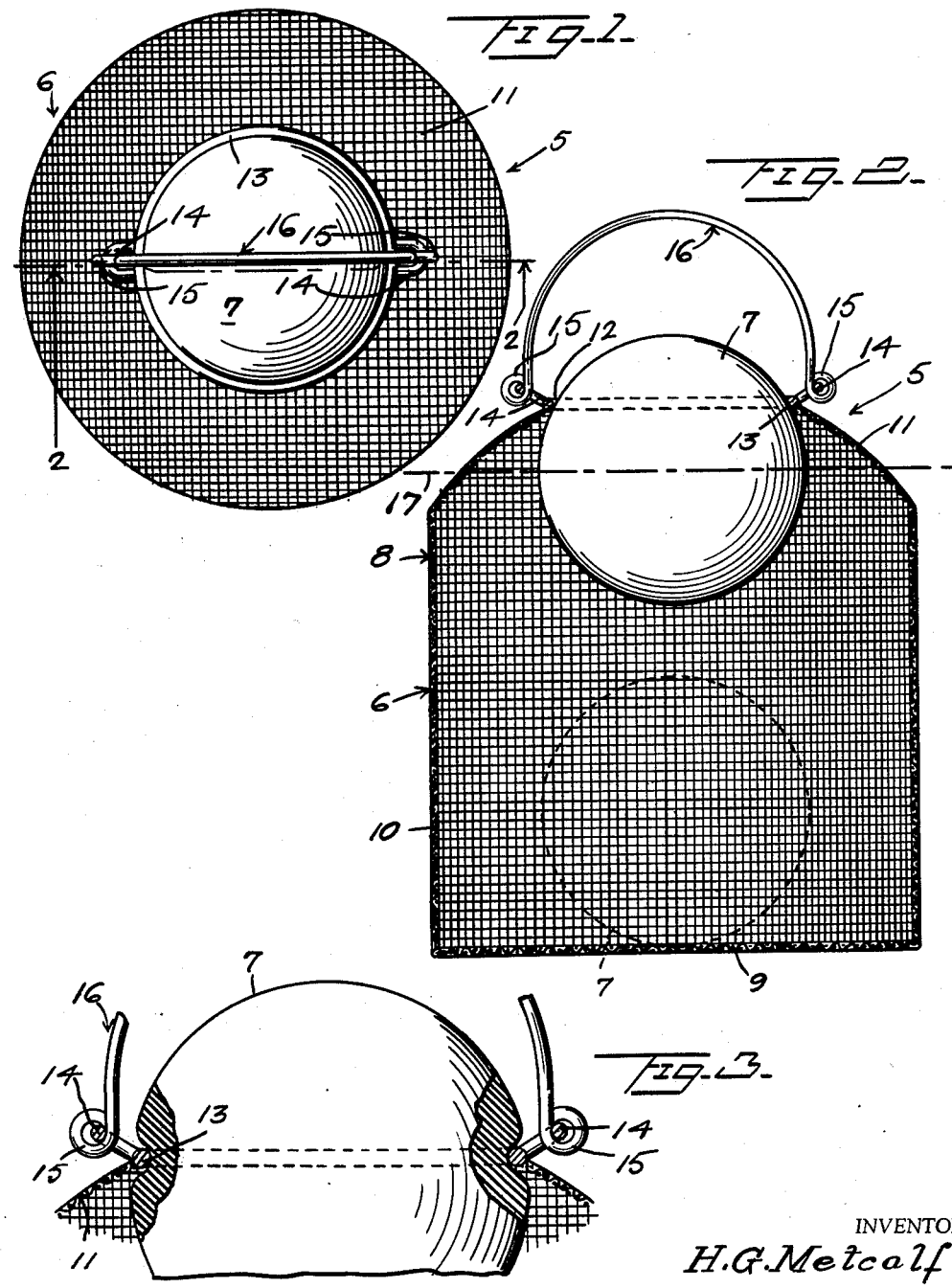

Harry G. Metcalf, Sarasota, Fla.

Application March 29, 1957, Serial No. 649,400

6 Claims. (Cl. 43—55)

This invention relates to a container for live fish bait of the type which is adapted to be placed in the water for holding live bait, and has for a primary object to provide such a bait container of extremely simple construction having a single part functioning as an automatic closure for the container and as a buoyancy member to maintain the container afloat.

More particularly, it is an object of the invention to provide a bait container having an opening in the top thereof affording access to the interior of the container and with a closure which automatically closes said container opening when the container is partially submerged and which closure automatically resumes an open position, exposing the container opening, when the bait container is raised from the water.

A further object of the invention is to provide a live fish bait container which may be composed of fewer parts than other containers due to the fact that the automatic closure is confined in the container without being secured thereto and functions as the container float as well as the container closure.

Various other objects and advantages of the invention will hereinafter become more fully apparent from the following description of the drawing, illustrating a presently preferred embodiment thereof, and wherein:

Figure 1 is a top plan view of a live bait container constructed in accordance with the invention;

Figure 2 is a central vertical sectional view, partly in elevation thereof, taken substantially along a plane as indicated by the line 2—2 of Figure 1, and Figure 3 is an enlarged fragmentary central sectional view, partly in elevation, of the upper portion of the container.

Referring more specifically to the drawing, the live bait container with automatic closure in its entirety is designated generally 5 and includes a foraminous container or receptacle, designated generally 6, and a combination closure and float 7.

The container 6 may be formed of mesh wire fabric as illustrated and designated 8, or of any other suitable foraminous material and includes a bottom 9 having an upstanding side wall 10, an annular top portion 11, and an opening 12 at the center of the top portion 11 and which is preferably defined by a ring member 13 of substantial cross sectional thickness which is secured in any suitable manner to the top central portion of said top portion 11. The side wall 10 is shown as being cylindrical but may be of any other desired shape and the annular top portion 11 is illustrated as forming an upwardly tapered outwardly bowed annular extension of the upper end of the wall 10, but may be otherwise constructed and have other shapes so long as it provides a support for the ring member 13 which defines the circular opening 12 in the top of the container 6. The ring member 13 preferably has loops or eyes 14 fixed to and projecting outwardly from diametrically opposite portions thereof to which the ends 15 of a carrying bail 16 are pivotally connected.

The closure and float 7 comprises a ball or sphere formed from a buoyant material and which is capable of being compressed. The sphere 7 is of a diameter substantially less than the diameter of the container 6 but of a diameter somewhat greater than the diameter of the opening 12. The diameter of the opening 12 is preferably about nine tenths of the diameter of the sphere 7.

The closure 7 is preferably sufficiently compressible so that it can be forced through the ring member 13 into the foraminous container 6, which container is adapted to contain live bait, such as minnows, not shown. The buoyant closure 7, due to its weight, will normally assume a position resting on the container bottom 9 when the container is out of the water, as seen in dotted lines in Figure 2, for exposing the container opening 12 so that live bait can be applied to the container 6 through the opening 12, or removed therefrom. When the container 6 is placed in the water and with the container right side up as shown in Figure 2, as the lower portion of the container is submerged, the buoyant closure 7 will rise and assume a position against the ring member 13 for closing the opening 12, as seen in Figures 1 and 2. The closure 7 will be guided into the ring member 13 by the upper portion 11 of the container. The closure 7, in its closed position of Figures 1 and 2, will also function to maintain the closure and container 5 afloat with the upper portion of the container 6 disposed above the surface of the water as indicated at 17 in Figure 2. If it is desired to again remove bait from the container 6, it is only necessary to lift the container by the bail 16 out of the water. As this is accomplished, the closure 7 will drop by gravity into the bottom of the container 6 according access to the interior of the container through the opening 12. Replacement of the container 6 in the water will cause the closure 7 to return to its closed position automatically.

The closure 7 may be secured in a closed position by grasping and pulling upwardly on the sphere so that a portion thereof will be compressed within the ring 13, as seen in Figure 3, and the closure thus gripped and held by the ring 13 will remain in a position for closing the opening 12 until said closure is again forced downwardly through the ring 13.

From the foregoing it will be apparent that a live bait container of simple construction has been provided wherein a single buoyant member functions as an automatic closure and also as a float for maintaining the live bait container afloat. Additionally, the combination closure and float does not require the use of latches or hinges but rather is loosely confined within the foraminous container to assume a closed position as the container is lowered in the water and to return to an open position as the container is removed from the water.

Various modifications and changes are contemplated and may be resorted to, without departing from the function or scope of the invention as hereinafter defined by the appended claims.

I claim as my invention:

1. A live bait container with automatic closure comprising a foraminous container for live bait having a top portion provided with an access opening of a restricted size relative to the cross sectional size of the container portion disposed therebeneath, a buoyant closure member loosely confined within said container including a portion of a cross sectional size greater than the size of said opening, said closure rising due to its buoyancy to completely close the container opening when the container is lowered right side up into water and functioning while in engagement in the container opening for supporting the container, and said closure dropping by gravity into the container away from the opening to resume an open position when the container is removed from the water.

2. A live bait container with automatic closure as in claim 1, said container opening being circular and said closure comprising a sphere.

3. A live bait container with automatic closure as in claim 2, said sphere being compressible whereby the sphere may be compressed and wedged in the container opening to retain the closure in a closed position supported by the top portion of the container.

4. A live bait container with automatic closure as in claim 3, said container being formed of a mesh material, a rigid ring member of heavy gauge material secured in the top portion of the container and defining the opening thereof.

5. A live bait container with automatic closure as in claim 1, said container opening being circular, said closure comprising a sphere of a diameter slightly greater than the diameter of said opening and substantially less than the diameter of the portion of the container disposed beneath said opening.

6. A live bait container with automatic closure as in claim 5, said container having an upwardly tapered portion below and surrounding the opening thereof for guiding the closure into the opening as the container is lowered into the water.

References Cited in the file of this patent

UNITED STATES PATENTS

| | | |
|---|---|---|
| Re. 21,644 | Griffin | Dec. 3, 1940 |
| 59,429 | Maxwell | Nov. 6, 1866 |
| 356,979 | Boman | Feb. 1, 1887 |
| 1,841,956 | Juergens | Jan. 19, 1932 |
| 2,482,315 | Bennett | Sept. 20, 1949 |
| 2,488,678 | Nardi | Nov. 22, 1949 |
| 2,539,412 | Faris | Jan. 30, 1951 |
| 2,573,352 | Nicodemus | Oct. 30, 1951 |
| 2,614,358 | Adams | Oct. 21, 1952 |